US005956933A

United States Patent [19]
Heard

[11] Patent Number: 5,956,933
[45] Date of Patent: Sep. 28, 1999

[54] SYSTEM FOR HARVESTING FRUIT FROM CITRUS TREES AND FOR CONVEYING THE HARVESTED FRUIT TO A TRUCK FOR HAULAGE

[76] Inventor: Jimmy C. Heard, 131 Lake Apthorpe Dr., Lake Placid, Fla. 33852

[21] Appl. No.: 08/987,362

[22] Filed: Dec. 9, 1997

[51] Int. Cl.⁶ .................................................. A01D 46/22
[52] U.S. Cl. ......................... 56/329; 56/328.1; 56/330; 56/334; 56/327.1
[58] Field of Search .................................. 56/328.1, 329, 56/330, 334, 331, 340.1, 327.1

[56] References Cited

U.S. PATENT DOCUMENTS

| 3,656,287 | 4/1972 | Morrison et al. | 56/340.1 |
|---|---|---|---|
| 3,943,688 | 3/1976 | Billings | 56/328.1 |
| 4,335,570 | 6/1982 | Fitzmaurice | 56/327 R |
| 4,341,062 | 7/1982 | Scudder | 56/330 |
| 4,750,322 | 6/1988 | Korthuis | 56/328.1 |
| 4,860,529 | 8/1989 | Peterson et al. | 56/330 |
| 4,913,680 | 4/1990 | Desmarais | 56/330 |
| 4,976,094 | 12/1990 | Williamson et al. | 56/328.1 |
| 5,092,113 | 3/1992 | Turunen | 56/330 |
| 5,113,644 | 5/1992 | Windemuller et al. | 56/330 |
| 5,170,614 | 12/1992 | Williamson et al. | 56/330 |
| 5,259,177 | 11/1993 | Windemuller et al. | 56/330 |
| 5,339,612 | 8/1994 | Scott | 56/328.1 |
| 5,495,708 | 3/1996 | Scott et al. | 56/329 |

FOREIGN PATENT DOCUMENTS

| 2516755 | 5/1983 | France | 56/328.1 |
|---|---|---|---|
| 2698236 A1 | 5/1994 | France | 56/328.1 |
| 3343602 | 6/1985 | Germany | 56/328.1 |
| 8902193 | 3/1991 | Netherlands | 56/328.1 |
| 620238 | 8/1978 | U.S.S.R. | 56/340.1 |
| 656584 | 4/1979 | U.S.S.R. | 56/340.1 |

*Primary Examiner*—Thomas B. Will
*Assistant Examiner*—Arpad Fabian Kovacs

[57] ABSTRACT

An apparatus for harvesting food from plants comprising a housing with drive mechanisms. Such mechanisms are provided with at least one shaft rotatable with respect to the housing about a first axis, each shaft having a plurality of fingers mounted thereon. Further provided are components for linearly reciprocating each shaft along a second axis generally perpendicular with respect to the first axis.

13 Claims, 6 Drawing Sheets

ND BANK FOR HAULAGE

SYSTEM FOR HARVESTING FRUIT FROM CITRUS TREES AND FOR CONVEYING THE HARVESTED FRUIT TO A TRUCK FOR HAULAGE

BACKGROUND OF THE INVENTION

1. Field of the Invention

The present invention relates to a system for harvesting citrus from trees and for conveying the harvested fruit to a truck for haulage and more particularly pertains to harvesting fruit from citrus trees in a continuous and automatic cycle of operation.

2. Description of the Prior Art

The use of fruit pickers and conveyors is known in the prior art. More specifically, fruit pickers and conveyors heretofore devised and utilized for the purpose of facilitating harvesting are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,860,529 issued Aug. 29, 1989 to Peterson et al., and assigned to the United States of America as represented by the Secretary of Agriculture, discloses a shaking mechanism for fruit harvesting. In such mechanism, fingers extend radially outwardly from rotatable shafts with supplemental motion allowing an arcuate movement of the shafts. Such arcuate movement, as compared to the linear movement of the present invention, is deficient in that it reduces the area of a tree wherein the fruit removing forces are minimized.

While these devices fulfill their respective, particular objectives and requirements, the aforementioned patents do not describe a system for harvesting citrus from trees and for conveying the harvested fruit to a truck for haulage that allows for a continuous and automatic cycle of operation.

In this respect, the system for harvesting citrus from trees and for conveying the harvested fruit to a truck for haulage according to the present invention substantially departs from the conventional concepts and designs of the prior art, and in doing so provides an apparatus primarily developed for the purpose of functioning in a continuous and automatic cycle of operation.

Therefore, it can be appreciated that there exists a continuing need for a new and improved system a system for harvesting citrus from trees and for conveying the harvested fruit to a truck for haulage which can be used to remove fruit from citrus trees. In this regard, the present invention substantially fulfills this need.

SUMMARY OF THE INVENTION

In view of the foregoing disadvantages inherent in the known types of fruit pickers and conveyors now present in the prior art, the present invention provides an improved system for harvesting citrus from trees and for conveying the harvested fruit to a truck for haulage. As such, the general purpose of the present invention, which will be described subsequently in greater detail, is to provide a new and improved system for harvesting citrus from trees and for conveying the harvested fruit to a truck for haulage and method which has all the advantages of the prior art and none of the disadvantages.

To attain this, the present invention essentially comprises a new and improved system for harvesting fruit from citrus trees and for conveying the harvested fruit to a truck for haulage all comprising, in combination, a housing having vertically extending, laterally spaced side walls each defined by a front, a rear, a top, and a bottom bar and an upper horizontal roof for coupling the side walls at their top bars for passage over a row of citrus trees bearing fruit to be harvested, the housing having a front end and a rear end with drive members to move the housing in a first direction of motion; a pair of primary conveyors, one located adjacent to a bottom bar of each side wall having an upper path of travel for conveying fruit to the rear end of the housing; a pair of vertical conveyors located adjacent to the rear end of the housing each having a lower extent situated adjacent to a rear of an associated one of the primary conveyors to lift fruit from the primary conveyor to an upper extent above the roof of the housing and distanced rearward of the rear of the corresponding side wall; a horizontally disposed unidirectional conveyor belt adapted to move fruit from the upper extent of one vertical conveyor to the upper extent of the other vertical conveyor; a bi-directional discharge conveyor located above one side wall of the housing with a spout at each end angled outwardly from the housing and adapted to convey fruit from the discharge conveyor to either end of the housing as a function of the direction of movement of the discharge conveyor; a plurality of vertically disposed rotatable shafts rotatably coupled between the bottom and top bars of the side walls of the housing in co-planar relationship therewith and in coaxial alignment with other shafts of a common side wall, each shaft rotatably coupled at a top and bottom thereof to a pair of upper and lower plungers with each plunger being slidably situated within a pair of associated cylindrical sleeves coupled in coplanar relationship with the associated side wall, whereby an axis about which each shaft rotates may be linearly translated forwardly and rearwardly within a plane in which the side wall remains, each shaft further having a plurality of rows of radially extending fingers connected to the corresponding shaft for rotation with the shaft thereby allowing movement of the fingers between an interior orientation adjacent to the trees to be harvested and an exterior position remote therefrom with the direction of motion allowing the fingers to rotate adjacent to the tree; a drive motor coupled between each shaft and at least one of the plungers of the shaft to effect the rotation of its associated shaft and fingers; a plurality of reciprocating mechanisms each including a reciprocating member having a first end coupled to an end of at least one of the plungers of the corresponding shaft and a second end eccentrically coupled to an eccentric disk which is rotatably coupled about a vertical axis residing in coplanar relationship with the associated side wall adjacent to the corresponding front bar, each disk of the reciprocating mechanisms is adapted to be rotated to effect a linear oscillation to each shaft along a horizontal axis which remains perpendicular with respect to the shaft and in coplanar relationship with the corresponding side wall; and a plurality of planar circular plates each rotatably coupled to a first end of a length adjusting cylinder which has a second end connected to an associated one of side walls, the circular plates situated about an axis offset from a vertical axis, wherein the circular plates connected to a common side wall are in a coplanar relationship during use, whereby the axis of each circular plate is adapted to be biased outwardly toward the corresponding side wall when abutted with trunks of the citrus trees such that upper surfaces of each plate residing above an adjacent primary conveyor serve to receive fruit harvested from the tree by the fingers and allow fruit to roll to the associated primary conveyor belt.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system for harvesting citrus from trees and for conveying the harvested fruit to a truck for haulage which has all of the advantages of the prior art fruit pickers and conveyors and none of the disadvantages.

It is another object of the present invention to provide a new and improved system for harvesting citrus from trees and for conveying the harvested fruit to a truck for haulage which may be easily and efficiently manufactured and marketed.

It is further object of the present invention to provide a new and improved system for harvesting citrus from trees and for conveying the harvested fruit to a truck for haulage which is of durable and reliable constructions.

An even further object of the present invention is to provide a new and improved system for harvesting citrus from trees and for conveying the harvested fruit to a truck for haulage which is susceptible of a low cost of manufacture with regard to both materials and labor, and which accordingly is then susceptible of low prices of sale to the consuming public, thereby making such system for harvesting citrus from trees and for conveying the harvested fruit to a truck for haulage economically available to the buying public.

Even still another object of the present invention is to provide a system for harvesting citrus from trees and for conveying the harvested fruit to a truck for haulage and, more particularly, to harvesting fruit from citrus trees.

Lastly, it is an object of the present invention to provide a new and improved apparatus for harvesting food from plants comprising a housing with drive mechanisms. Such mechanisms are provided with at least one shaft rotatable with respect to the housing about a first axis, each shaft having a plurality of fingers mounted thereon. Further provided are components for linearly reciprocating each shaft along a second axis generally perpendicular with respect to the first axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
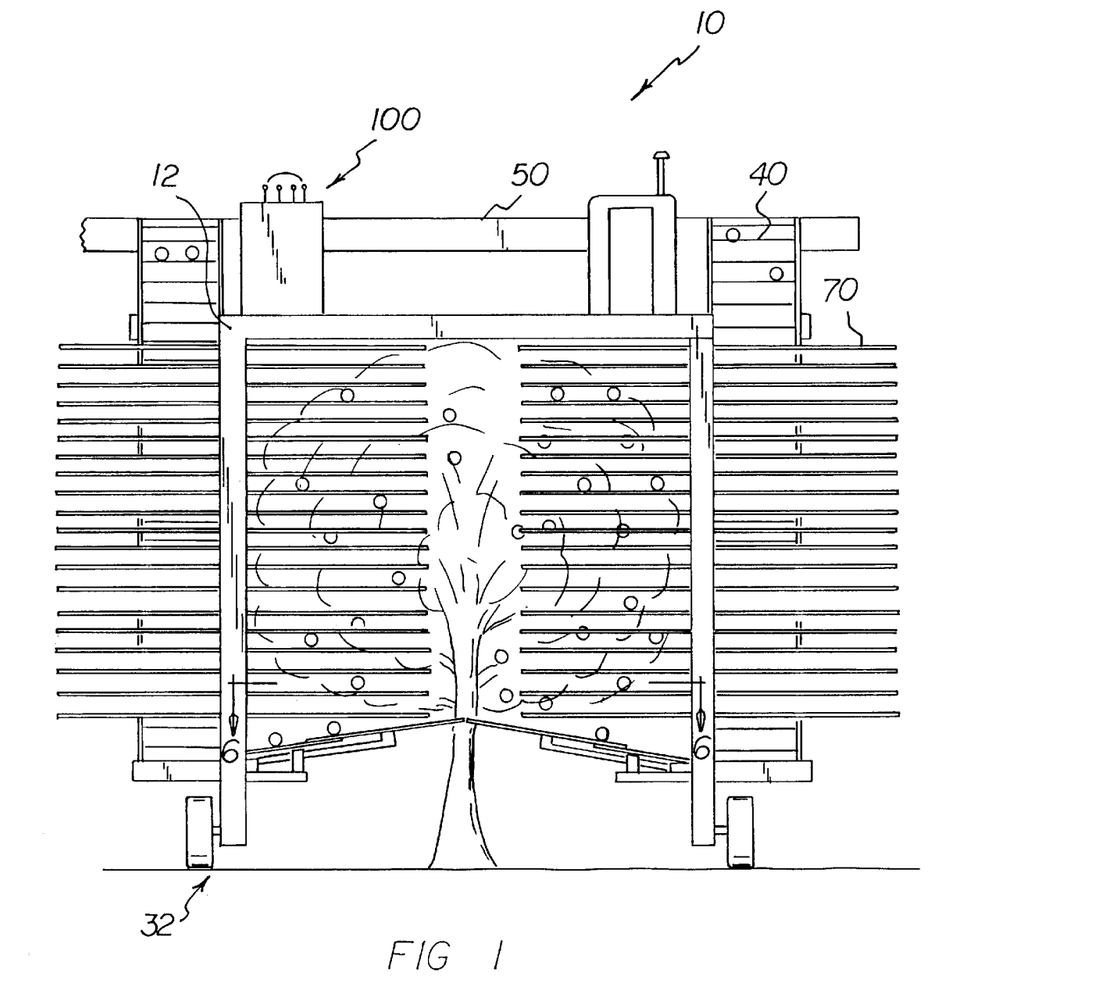
FIG. 1 is a front elevational view of the preferred embodiment of the system for harvesting citrus from trees and for conveying the harvested fruit to a truck for haulage constructed in accordance with the principles of the present invention.

With reference now to the drawings, and in particular to FIG. 1 thereof, the preferred embodiment of the new and improved system for harvesting citrus from trees and for conveying the harvested fruit to a truck for haulage embodying the principles and concepts of the present invention and generally designated by the reference numeral 10 will be described.

The present invention, the system for harvesting citrus from trees and for conveying the harvested fruit to a truck for haulage 10 is comprised of a plurality of components. Such components in their broadest context include a housing, primary conveyors, vertical conveyers, a horizontal upper conveyor, a bi-directional discharge conveyor, rotatable shafts, drive motor, reciprocating mechanisms, and circular plates. Such components are individually configured and correlated with respect to each other so as to attain the desired objective.

Specifically, the present invention includes a system 10 adapted for harvesting food from plants, citrus fruit from citrus trees in the primary embodiment, and for conveying the harvested fruit to a truck for haulage in such a manner as to be adapted for a continuous and automatic cycle of operation.

The central component of the system 10 is a housing 12. The housing as vertically extending laterally spaced side walls 14. Each side wall has a front bar 16 and a rear bar 18. Each side wall also has a top bar 20 and a bottom bar 22. Coupling the top bars is an upper horizontal roof 24. The horizontal roof couples together all of the bars of the side wall at their top bars and is configured with an open front, open rear, open bottom but a closed top for passage of the entire housing over a row of fruit-bearing trees of the like, preferably citrus trees bearing fruit to be harvested.

Figure 2:
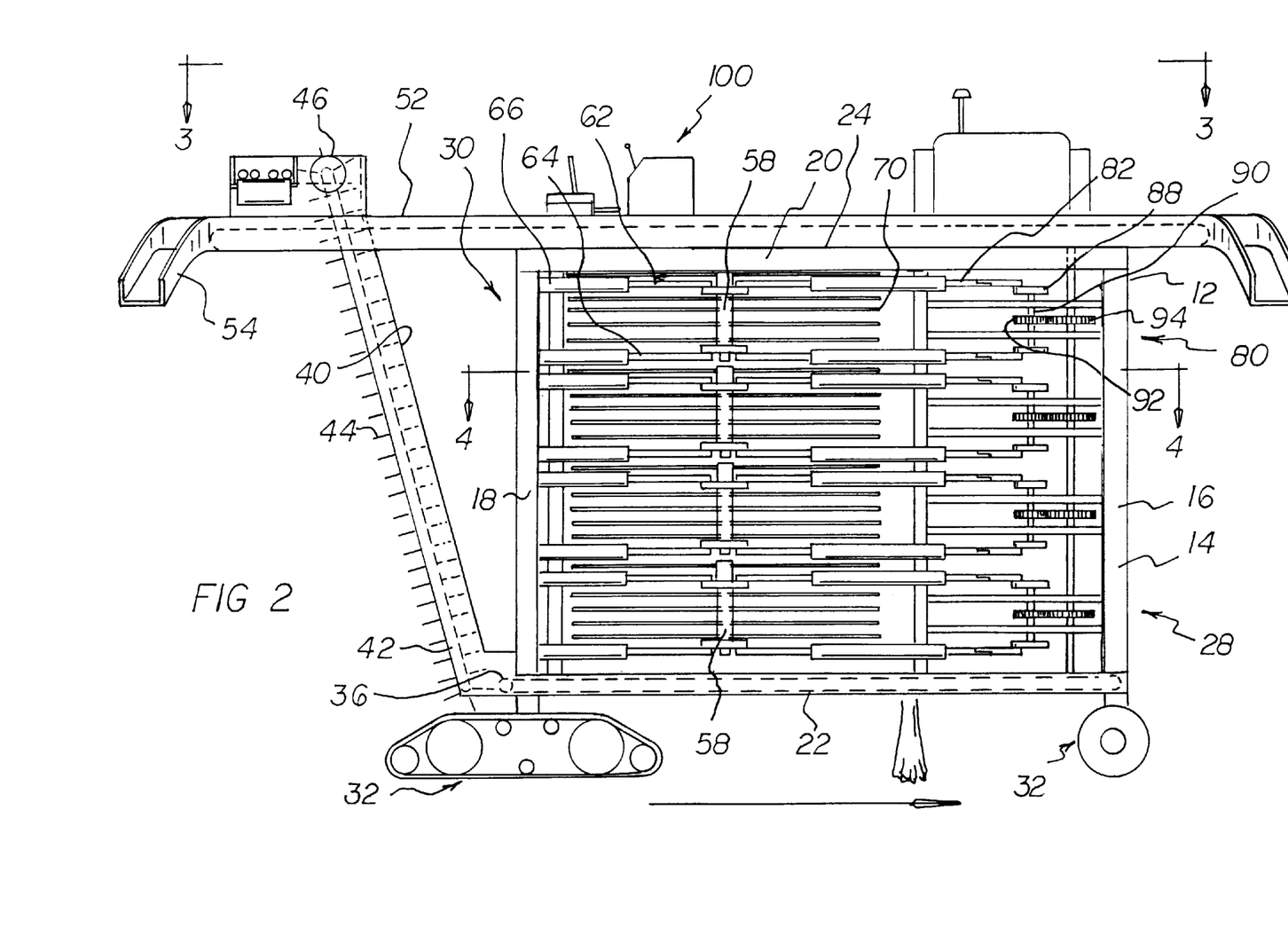
FIG. 2 is a side elevational view of the system shown in FIG. 1.
Figure 3:
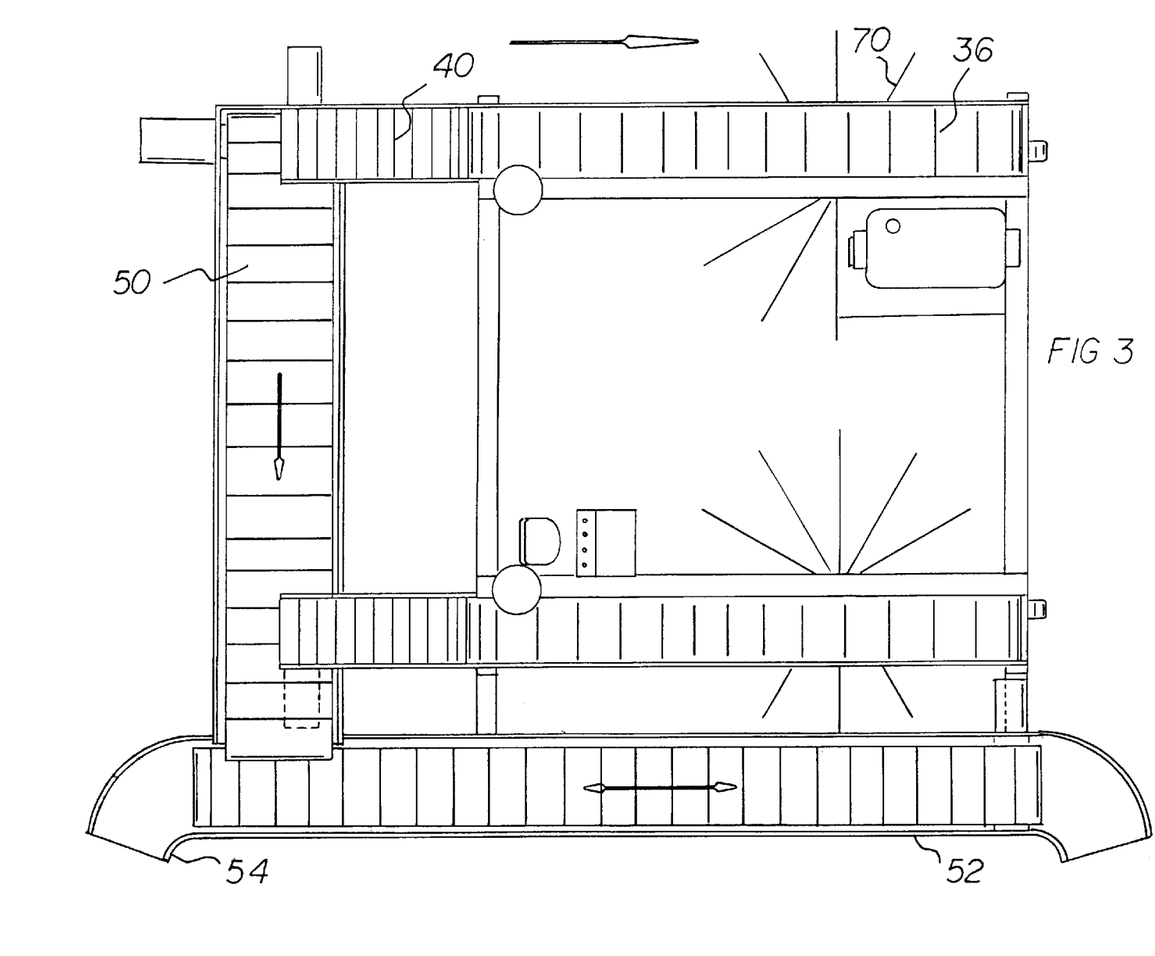
FIG. 3 is a top plan view of the system shown in the prior figures.
Figure 6:
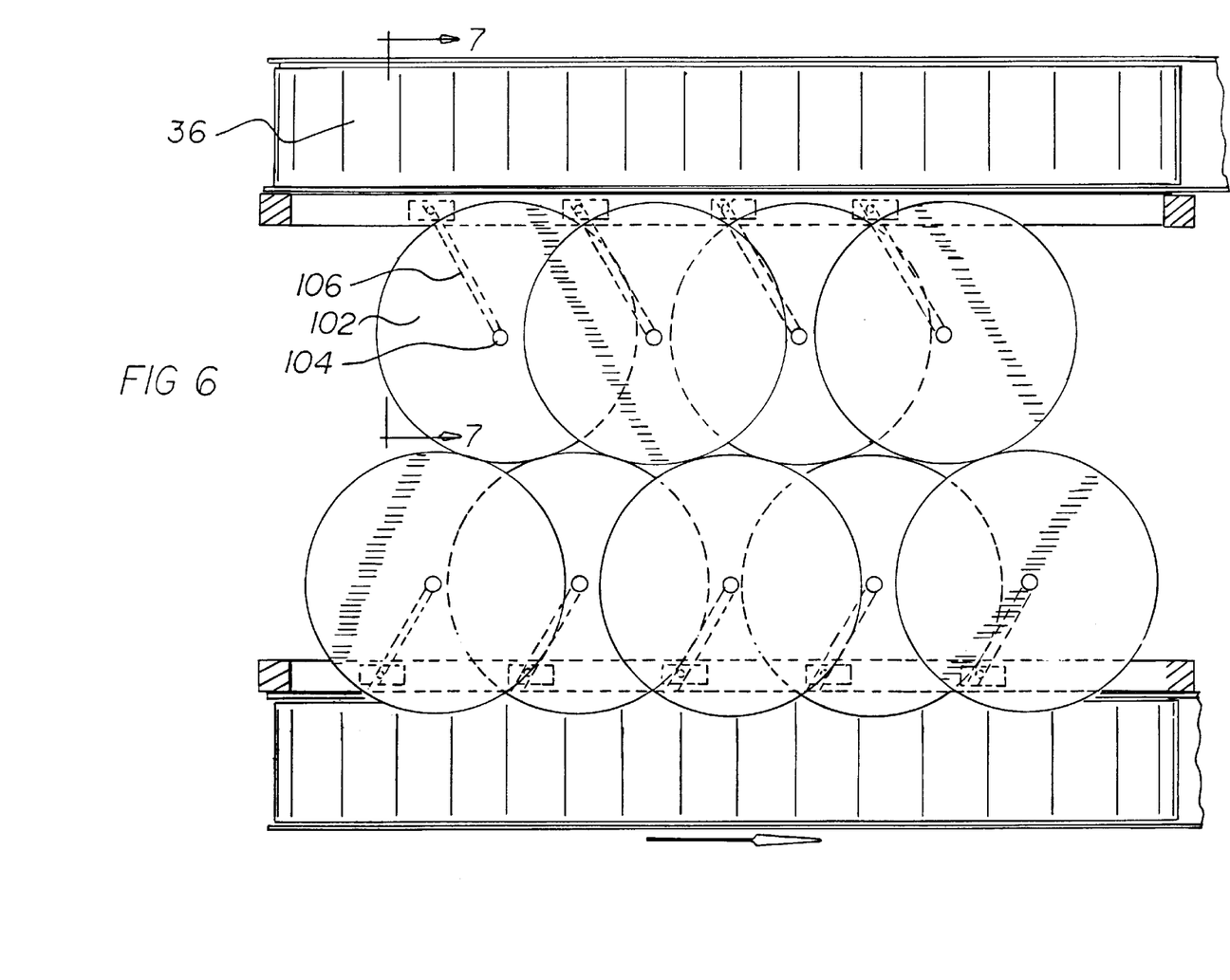
FIG. 6 is a top elevational view of the system similar to FIG. 3 but with portions harvested to show certain internal constructions thereof.

The overall housing has an open front end 28 and an open rear end 30. Driving members 32 are located at the lower extents of the housing and are adapted through appropriate power-imparting mechanisms of a conventional nature to move the housing in a forward or first direction of motion. Note the directional arrows of the housing in FIGS. 2 and 6. In the disclosed preferred embodiment, one of the drive members is a track such as those at the rear of the housing and a wheel such as that at the front of the housing. In addition, it should be understood, that the distance between the axis of rotation of the track and wheel is such that each such drive member is independently adapted to be moved from the housing as a function of the contour of the land over which the housing is to traverse during the harvesting of fruit.

Next provided as part of the system is a pair of primary conveyors 36. One of each such conveyors is located adjacent to a bottom bar of each side wall. Each conveyor is adapted to move in a continuous cycle of operation. Each conveyor has an upper path of travel for conveying fruit to the rear end of the housing. This is in a second direction, a direction opposite from the direction of motion of the housing. The lower path of travel of the conveyor is in the direction of motion of the housing.

The appropriate drive mechanisms of a conventional nature are adapted to rotate the conveyors in the intended directions, preferably with each conveyor having its own independent drive mechanism.

A pair of vertical conveyors 40 are next provided. The vertical conveyors are located adjacent to the rear end of the housing. Each vertical conveyor has a lower extent 42 situated adjacent to the rear of an associated one of the primary conveyors to which it is associated during operation and use. Each vertical conveyor has outwardly extending plates 44 adapted to receive and lift fruit conveyed thereto by the primary conveyor to an upper extent 46. Such upper extent is above the roof of the housing. It is also distanced slightly rearwardly of the rear of the corresponding side wall. Note FIG. 2.

Here again appropriate drive mechanisms of a conventional nature are utilized to power the vertical conveyors, each preferably operable independent of the other and independent of the primary conveyors.

Located above the roof of the housing at a location rearwardly of the upper extent of the vertical conveyor is a horizontally disposed, uni-directional conveyor belt 50. Such uni-directional conveyor belt is adapted to move fruit from the upper extent of one vertical conveyor to the upper extent of the upper vertical conveyor. In this manner, all of the fruit conveyed by the various conveyors are thus brought to a common location above and rearwardly of the housing independent of which conveyor or conveyors brought the fruit to such location. A conventional drive mechanism is provided for powering the uni-directional conveyor belt in a common direction during operation and use.

The final component of the conveyor assembly is a bi-directional discharge conveyor 52. The bi-directional discharge conveyor is located above one side wall of the housing and extends forwardly of the housing and rearwardly of the housing. Each end of the bi-directional conveyor is provided with a spout 54. Each spout is adapted to allow the flow of fruit from the conveyor assembly to a location where it may be dropped into the storage area of a truck for haulage to an appropriate site. The spout is preferably angled outwardly in the primary embodiment to facilitate the moving of the storage part of a truck to an appropriate location beneath the spout. The drive mechanism for the bi-directional conveyor is adapted to allow an upper path of travel movable to move fruit from the area beneath the unidirectional conveyor belt to either spout as a function of the intended truck to be filled. This allows one truck to move along with the housing and to receive fruit from one spout until such truck is full whereafter the direction of the bi-directional discharge conveyor will allow the other spout to begin filling a second truck without stopping the movement of the housing or conveyor assembly. This allows, in the primary embodiment, the continuous and uninterrupted harvesting of fruit from truck to truck continuously in a system type arrangement.

Figures 4, 5:
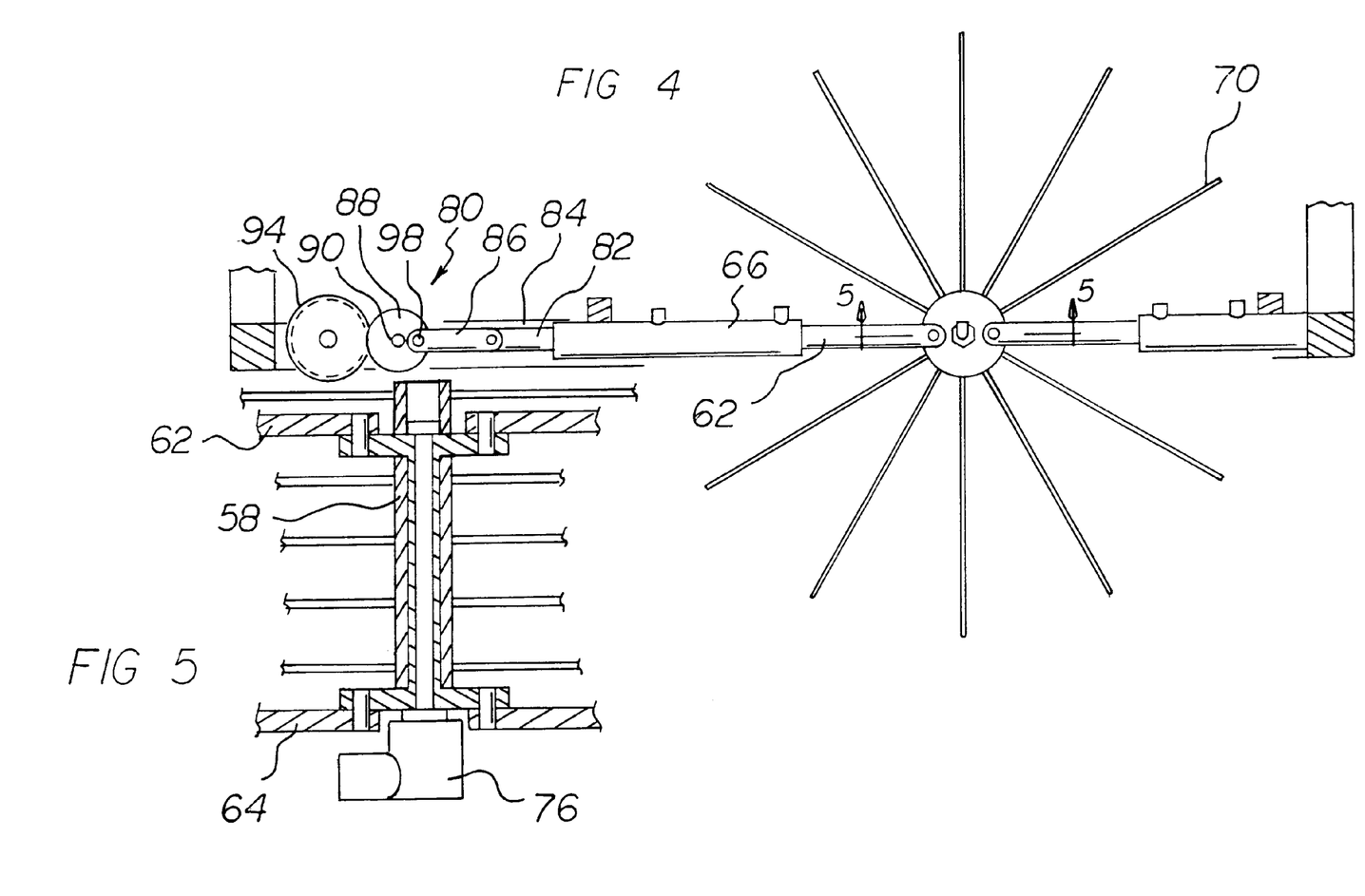
FIG. 4 is an enlarged top elevational view taken along line 4—4 of FIG. 2.
FIG. 5 is cross-sectional view taken along line 5—5 of FIG. 4.

The removal of fruit from trees is effected by mechanisms including a plurality of vertically disposed rotatable shafts 58. Such shafts are rotatably coupled between the top bar and bottom bar of the side walls of the housing. The shafts are preferably respectively in a co-planar relationship with the front and rear bars of the housing. In the preferred embodiment as shown particularly in FIGS. 2, 4 and 5, the rotatable shafts on each side include a bank of co-axial short shafts. Each shaft is rotatably coupled at a top and a bottom thereof. It is supported by a pair of upper plungers 62 and lower plungers 64. Each plunger is slidably situated within an associated cylindrical sleeve 66. The cylindrical sleeves are secured in co-planar relationship with its associated side wall.

Due to the relationship between the rotatable shafts and their plungers and sleeves, the vertical axis about which the shafts rotate may be linearly translated forwardly and rearwardly. Such translation is within the plane in which the side walls remain.

Each rotatable shaft is further provided with a plurality of rows of radially extending fingers 70. The fingers are connected to a corresponding associated shaft to allow rotation of the fingers with the rotation of the shaft. This allows movement of the fingers between an interior orientation adjacent to the trees to be harvested and an exterior position remote from the direction of motion. This allows the fingers to rotate adjacent to the tree for contacting fruit and branches of the tree to effect the removal of ripe fruit ready for harvesting to be dropped from the tree during operation and use.

Each individual shaft, four linearly aligned on each side of the housing in the preferred embodiment, is provided with its own drive motor 76. Each drive motor is coupled between each shaft and at least one of the plungers of the shaft. The function of the drive motor is to effect the desired rotation of the shaft and fingers to move the fingers adjacent to the tree in a direction opposite from the direction of motion of the housing. The drive motor can effect a positive driving of the shaft and fingers or, in the alternative, the drive motor can effect a braking action of a predetermined force to restrict the rotation of the associated shaft and fingers as would occur by the motion imparted by the housing translated to the fingers moving with respect to the branches of the trees.

A plurality of reciprocating mechanisms 80 is also provided for each rotatable shaft and its associated plungers and cylinders. Such reciprocating mechanisms include a reciprocating member 82. Each reciprocating member has a first end 84 coupled to an end of at least one of the plungers of its associated corresponding shaft. Each reciprocating member has a second end 86 eccentrically coupled to an eccentric disk 88. The eccentric disk is rotatably coupled about a shaft 90 with a vertical axis residing in co-planar relationship with the associated forward side wall of the corresponding front bar of the housing. Each disk of the reciprocating mechanism is adapted to be rotated to effect the desired linear oscillation of each shaft along a horizontal axis coincident with its associated shaft and cylinder. The vertical axis of the rotatable shaft is perpendicular to the horizontal axis of the sleeve in a co-planar relationship with the corresponding side wall. A drive gear 92 on the vertical shaft and a driven gear 94 supported on the short shaft with the eccentric gears effects the intended reciprocation. It should be understood that the eccentric disk may be coupled to the second end of the reciprocating member through a pin 98 at any of a pre-selected radial distances from the center of the eccentric disk to vary the throw or extent of linear reciprocation of the rotatable rods during operation and use. Such throw may be varied as a function of the intended mode of operation. Similarly, the drive motor for each shaft may be varied, once again, as a function of the intended operation. Control mechanisms 100 allow an operator to vary the various operating parameters of the system.

Lastly provided as a component of the system are a plurality of circular plates 102. Each plate is rotatably coupled by a pin 104 to a first end of a length-adjusting cylinder 106. Such cylinder has a second end connected to an associated one side wall. The circular plates are preferably situated about an axis offset from a vertical axis. In this manner, when the circular plates are connected to a common side wall in a bank, they are in co-planar relationship during operation and use. The tilting of the plates downwardly toward the primary conveyor allows dropped fruit to roll to the primary conveyors during operation and use. The axis of each circular plate is adapted to be biased outwardly in a direction toward the direction of travel of the housing to form an acute angle between the direction of movement of the housing and the axis of the cylinder. When, however, a portion of any plate contacts a tree, the plate including its axis will move inwardly into the cylinder through an associated shaft against pneumatic pressure to allow the passage of the plates with respect to a tree. When any portion of a plate abuts with the trunk of a tree, the upper surface of each plate resides above the adjacent primary conveyor which serves to receive fruit harvested from the tree by the fingers and allows the fruit to roll to the associated primary conveyor belt.

Figures 7A, 7B:
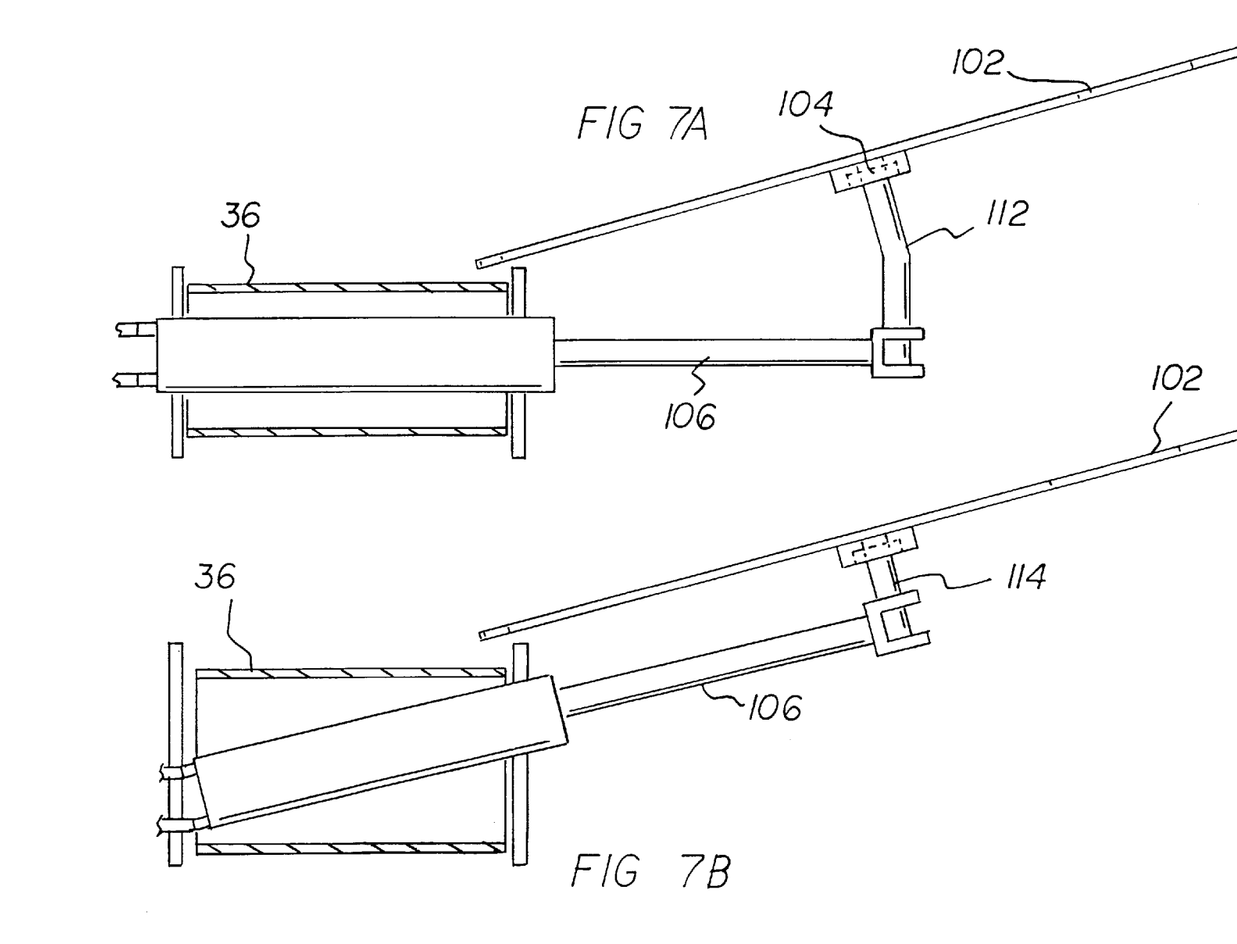
FIGS. 7A and 7B show alternate embodiments for allowing the falling fruit to be moved to a conveyor.

In the FIG. 7-A embodiment, the cylinder is in a horizontal orientation and a vertically upstanding post 112 is formed with a slight angle to effect the camping of the plate to allow rolling of fruit to the primary conveyor. In the alternate embodiment, the intermediate shaft 114 is linear and the cylinder is formed at an angle to allow the camping of the plate in the intended orientation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved system for harvesting fruit from citrus trees and for conveying the harvested fruit to a truck for haulage comprising, in combination:

a housing having vertically extending, laterally spaced side walls each defined by a front, a rear, a top, and a bottom bar and an upper horizontal roof for coupling the side walls at their top bars for passage over a row of citrus trees bearing fruit to be harvested, the housing having a front end and a rear end with drive members to move the housing in a first direction of motion;

a pair of primary conveyors, one located adjacent to a bottom bar of each side wall having an upper path of travel for conveying fruit to the rear end of the housing;

a pair of vertical conveyors located adjacent to the rear end of the housing each having a lower extent situated adjacent to a rear of an associated one of the primary conveyors to lift fruit from the primary conveyor to an upper extent above the roof of the housing and distanced rearward of the rear of the corresponding side wall;

a horizontally disposed unidirectional conveyor belt adapted to move fruit from the upper extent of one vertical conveyor to the upper extent of the other vertical conveyor;

a bi-directional discharge conveyor located above one side wall of the housing with a spout at each end angled outwardly from the housing and adapted to convey fruit from the discharge conveyor to either end of the housing as a function of the direction of movement of the discharge conveyor;

a plurality of vertically disposed rotatable shafts rotatably coupled between the bottom and top bars of the side walls of the housing in co-planar relationship therewith and in coaxial alignment with other shafts of a common side wall, each shaft rotatably coupled at a top and bottom thereof to a pair of upper and lower plungers with each plunger being slidably situated within a pair of associated cylindrical sleeves coupled in coplanar relationship with the associated side wall, whereby an axis about which each shaft rotates may be linearly translated forwardly and rearwardly within a plane in which the side wall remains, each shaft further having a plurality of rows of radially extending fingers connected to the corresponding shaft for rotation with the shaft thereby allowing movement of the fingers between an interior orientation adjacent to the trees to be harvested and an exterior position remote therefrom with the direction of motion allowing the fingers to rotate adjacent to the tree;

a drive motor coupled between each shaft and at least one of the plungers of the shaft to effect the rotation of its associated shaft and fingers;

a plurality of reciprocating mechanisms each including a reciprocating member having a first end coupled to an end of at least one of the plungers of the corresponding shaft and a second end eccentrically coupled to an eccentric disk which is rotatably coupled about a vertical axis residing in coplanar relationship with the associated side wall adjacent to the corresponding front bar, each disk of the reciprocating mechanisms is adapted to be rotated to effect a linear oscillation to each shaft along a horizontal axis which remains perpendicular with respect to the shaft and in coplanar relationship with the corresponding side wall; and a plurality of planar circular plates each rotatably coupled to a first end of a length adjusting cylinder which has a second end connected to an associated one of side walls, the circular plates situated about an axis offset from a vertical axis, wherein the circular plates connected to a common side wall are in a coplanar relationship during use, whereby the axis of each circular plate is adapted to be biased outwardly toward the corresponding side wall when abutted with trunks of the citrus trees such that upper surfaces of each plate residing above an adjacent primary conveyor serve to receive fruit harvested from the tree by the fingers and allow fruit to roll to the associated primary conveyor belt.

2. An apparatus for harvesting food from plants comprising:

a housing with drive mechanisms;

at least one rotatable power-driven shaft rotatable with resplect to the housing about a first vertical axis each shaft having a plurality of fingers mounted thereon for rotation of the fingers in an essentially horizontal plane;

linear power-driven components for linearly reciprocating each shaft with respect to the housing along a second axis generally perpendicular with respect to the first axis concurrently and continuously with the rotation of the shaft and fingers during operation and use.

3. An apparatus for harvesting food from plants as set forth in claim 2 wherein the second axis is situated in alignment with the movement of the housing.

4. An apparatus for harvesting food from plants as set forth in claim 2 wherein the first axis is vertically disposed.

5. An apparatus for harvesting food from plants as set forth in claim 2 wherein the housing includes two side walls connected at tops thereof such that each side wall may pass on either side of the plants.

6. An apparatus for harvesting food from plants as set forth in claim 5 wherein at least one shaft is positioned on each side wall.

7. An apparatus for harvesting food from plants as set forth in claim 2 wherein the components for reciprocating the first axis includes a plurality of plungers and cylinders.

8. An apparatus for harvesting food from plants as set forth in claim 2 and further including a collector for collecting the food harvested.

9. An apparatus for harvesting food from plants as set forth in claim 2 and further including a conveyor for dispensing the food collected by the apparatus.

10. An apparatus for harvesting food from plants as set forth in claim 9 wherein at least one conveyor dispenses food from a single side of the housing.

11. An apparatus for harvesting food from plants as set forth in claim 9 wherein the at least one conveyor dispenses food from an elevated location.

12. An apparatus for harvesting food from plants as set forth in claim 9 wherein the at least one conveyor is capable of dispensing food from either one of two ends thereof.

13. An apparatus for harvesting food from plants as set forth in claim 2 and further included is a drive motor to effect the rotation of its associated shaft and fingers.

* * * * *